United States Patent
Cunningham et al.

(10) Patent No.: US 12,488,390 B2
(45) Date of Patent: Dec. 2, 2025

(54) SYSTEMS AND METHODS FOR MANAGING METRICS IN BLOCKCHAIN NETWORKS

(71) Applicant: Capital One Services, LLC, McLean, VA (US)

(72) Inventors: Sarah Jane Cunningham, Arlington, VA (US); John Jones, Alexandria, VA (US); Leeyat Bracha Tessler, Arlington, VA (US); James Holt Crews, Washington, DC (US); Zachary Benjamin Toal, Washington, DC (US); Jesse Do, Forest Hills, NY (US); Mario L. Munoz, Richmond, VA (US); Rocky Guo, Vienna, VA (US); Catherine Sun, Irvington, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 382 days.

(21) Appl. No.: 17/892,365

(22) Filed: Aug. 22, 2022

(65) Prior Publication Data

US 2024/0064032 A1   Feb. 22, 2024

(51) Int. Cl.
*G06Q 40/04* (2012.01)
*G06Q 10/0639* (2023.01)

(52) U.S. Cl.
CPC ......... *G06Q 40/04* (2013.01); *G06Q 10/0639* (2013.01); *G06Q 2220/00* (2013.01)

(58) Field of Classification Search
CPC ....................................................... G06Q 40/04
See application file for complete search history.

(56) References Cited

U.S. PATENT DOCUMENTS 12,099,997 B1 * 9/2024 Hoffberg ............. G06Q 20/065
2019/0080406 A1 * 3/2019 Molinari ................ G06Q 40/02
(Continued)

FOREIGN PATENT DOCUMENTS

WO   WO-2017145019 A1 * 8/2017 ............. G06Q 20/02

OTHER PUBLICATIONS

Claire Henly, Sam Hartnett, Sam Mardell, Buck Endemann, Ben Tejblum, and Daniel S. Cohen, Energizing the Future With Blockchain, Energy Law Journal vol. 39:197., Nov. 14, 2018. (Year: 2018).*
(Continued)

*Primary Examiner* — Kurtis Gills
(74) *Attorney, Agent, or Firm* — TROUTMAN PEPPER LOCKE LLP; Christopher J. Forstner; John A. Morrissett (57) ABSTRACT

The disclosed technology relates to assessing and securing credit risk using credit worthiness tokens issued in a blockchain network responsive to particular financial events. An exemplary blockchain node device may store an issuance smart contract associated with an identity and including a first wallet address and allocation parameters. An event query may be sent to an oracle device external to the blockchain network. The event query may include the identity. Event data associated with the identity may then be received from the oracle device in response to the event query. A number of credit worthiness tokens is determined based on an application of the allocation parameters to the event data. The determined number of credit worthiness tokens is then allocated to the identity via the first wallet address. Thereafter, the credit worthiness tokens can be transferred or collateralized, e.g., and can represent credit worthiness for the identity across financial institutions.

17 Claims, 5 Drawing Sheets

(56) References Cited

U.S. PATENT DOCUMENTS

| | | | |
|---|---|---|---|
| 2021/0019740 A1* | 1/2021 | Bhamidipati | G06Q 20/382 |
| 2022/0230240 A1* | 7/2022 | Sliwka | G06Q 40/02 |
| 2023/0078852 A1* | 3/2023 | Campbell | G06Q 50/02 |
| | | | 705/7.11 |

OTHER PUBLICATIONS

Matthews, Chris, "Data Gumbo, Topl partner on corporate ESG metric tracking blockchain tool," Houston Inno, Sep. 29, 2021 (4 pages).

* cited by examiner

SYSTEMS AND METHODS FOR MANAGING METRICS IN BLOCKCHAIN NETWORKS

FIELD

The disclosed technology relates to systems and methods for managing metrics in blockchain networks and more particularly to a more efficient, effective, and scalable metric repository that can be utilized to facilitate automated metric change notifications and more accurate downstream reporting.

BACKGROUND

Decentralized ledgers, such as blockchains, are an increasingly important tools used to manage, track, and transfer digital assets, with the benefits including heightened trust in transactions, decentralization of transactions so that "No" single entity controls the environment, and increased security. The increased security is due, in part, by the fact that the entire record of a digital asset is memorialized and encrypted in a distributed ledger database. Another feature of blockchain networks is the ability to store smart contracts that are self-executing software or program code that can automatically facilitate transactions based on stored algorithms or rules, as well as automatically communicate with devices and oracles that are external to the blockchain network.

Many enterprises, including financial institutions, use metrics for various business purposes. For example, metrics such as inflation, consumer price index, and macroeconomic risk may be used throughout an enterprise to price products or services or analyze lending risk. In another example, relatively large enterprises may have distinct business units that measure their respective operations differently, such as with respect to call service quality or customer service performance, as a result of differing metrics components, values, and/or data sources. Different metrics across an enterprise can negatively impact downstream reporting and associated business decisions, as well as aggregation of metric data across business units.

Currently, metric values and/or definitions are often maintained relatively informally in Structured Query Language (SQL), object-oriented, and other types of databases and database management systems (DBMSs). These metric repositories are inefficient and ineffective with respect to tracking metric metadata, such as when a metric was created and modified and how and by whom the metric was modified. Such metric modifications also currently occur without the knowledge of downstream users and other stakeholders, resulting in reliance on reports and data that are inaccurate and ineffective to meet objectives.

BRIEF SUMMARY

Examples of the present disclosure provide solutions to issues associated with metric databases and other repositories and describe and illustrate blockchain node devices that store metric definitions (e.g., components and data sources) as a smart contract on a blockchain network. The blockchain network provides a ledger of metric metadata and associated changes to allow stakeholders to utilize a repository of metrics via an interface provided by a metric management device, determine when metrics have changed, aggregate consistent metric values across an organization or enterprise, and generate more accurate downstream reports. For example, a change made to a metric can be recorded as a token on the blockchain network, which can be queried by a metric management device to identify the change. The metric management device can then query the smart contract associated with the change token to identify stakeholders for the metric, and then send a notification to the stakeholders according to stored notification rules. Thereby, this technology allows stakeholders to determine when metrics have changed, including with respect to derivative metrics that use the changed metrics, which informs subsequent analysis and reporting that relies on the associated metrics.

Accordingly, in some examples the disclosed technology includes a blockchain node device in a blockchain network. The blockchain node device includes a processor and memory in communication with the processor and storing instructions that, when executed by the processor, are configured to cause the blockchain node device to perform one or more methods. For example, the blockchain node device may store a smart contract having a first contract address in a blockchain network. The smart contract may be configured to mint a first metric token having a first token identifier and metric metadata including at least one or more components of a first metric and a first set of stakeholder identifiers. A determination may be made that a first one of the one or more components is a second metric based on a definition of the first one of the one or more components in the metric metadata. The definition comprises a second contract address and a second token identifier for a second metric token associated with the second metric. A consumer token may then be generated in the blockchain network that records a derivative link between the first metric and the second metric. A change token may be stored in the blockchain network in response to a received change transaction that modifies a second one of the one or more components of the first metric. The change token includes at least the first contract address and the first token identifier. A determination may be made that the first metric has changed based on a match of the first contract address and the first token identifier in a query received from a metric management device to the first contract address and the first token identifier in the change token. The metric management device may be external to the blockchain network. The first and second sets of stakeholder identifiers may be received from the first and second metric tokens, respectively, using the first contract address, the first token identifier, and the derivative link in the consumer token. The first and second sets of stakeholder identifiers may then be returned to the metric management device in response to the query to facilitate notification of entities associated with the first and second sets of stakeholder identifiers of the modification to the first metric.

The disclosed technology includes another blockchain node device that includes a processor and memory in communication with the processor and storing instructions that, when executed by the processor, are configured to cause the blockchain node device to perform one or more methods. For example, the blockchain node device may generate a first metric token in a blockchain network according to a received smart contract. The first metric token may have a first token identifier and may include metric metadata including components of a first metric and a first set of one or more stakeholder identifiers. A change token may then be stored in the blockchain network in response to a change transaction that modifies a first one of the components of the first metric. The change token may include a first contract address, the first token identifier, and an indication of the modified first one of the components. A determination is made that the first metric has changed based on a match of the first contract address and the first token identifier in a received query to the first contract address and the first token identifier in the change token. The first set of one or more stakeholder identifiers is retrieved from the first metric token using the first contract address and the first token identifier. The first set of one or more stakeholder identifiers is then returned in response to the received query to facilitate notification of entities associated with the first set of one or more stakeholder identifiers of the modification to the first metric.

The disclosed technology includes yet another blockchain node device that includes a processor and memory in communication with the processor and storing instructions that, when executed by the processor, are configured to cause the blockchain node device to perform one or more methods. For example, the blockchain node device may store a smart contract having a contract address in a blockchain network and configured to mint a metric token having a token identifier and including metric metadata including one or more stakeholder identifiers and a definition of a metric. A change token may be generated in the blockchain network in response to a received change transaction that modifies a first component of the metric. The change token may include the contract address, the token identifier, and an indication of the modified first component. A determination is made that the metric has changed based on a match in the change token of the contract address and the token identifier in a received query. The one or more stakeholder identifiers may be returned in response to the received query. The one or more stakeholder identifiers may be retrieved from the metric token using the contract address and the token identifier.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Examples of the disclosed technology may be utilized to improve enterprise metric repositories, and provide a distributed ledger for identifying metric stakeholders, metric changes, and derivative metrics, to thereby automate metric change notifications and facilitate consistent metric utilization at scale across an enterprise. In some examples, a blockchain node 108 generates a metric token that includes metadata for a metric, including components of the metric and stakeholder identifiers. The metric token may be generated according to a smart contract that is configured to report the new metric to a metric management device 104. In examples in which a component of the metric includes another metric, a consumer token is stored in the blockchain network 106 that records a derivative link between the metrics. The blockchain node 108 may then receive metric changes and generate change tokens that record the changes.

The metric management device 104 may subsequently query the blockchain network 106 via the blockchain node 108 for the change tokens, and receive stakeholder identifiers in response to the query when change tokens have been minted subsequent to a previous inquiry for the metric. The stakeholder identifiers can include identifiers associated with derivative metrics. With the stakeholder identifiers, the metric management device 104 can apply a set of stored rules to generate and send notifications regarding the metric change to thereby report the metric change to stakeholders. Optionally, the stakeholders may then use the metric management device 104 to query the blockchain network 106 to retrieve metadata regarding the metric and/or the metric change.

As will be described and illustrated in more detail below, by leveraging a blockchain network 106, this technology improves metric management, modification, and utilization to yield more accurate downstream utilization and reporting across an enterprise. Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
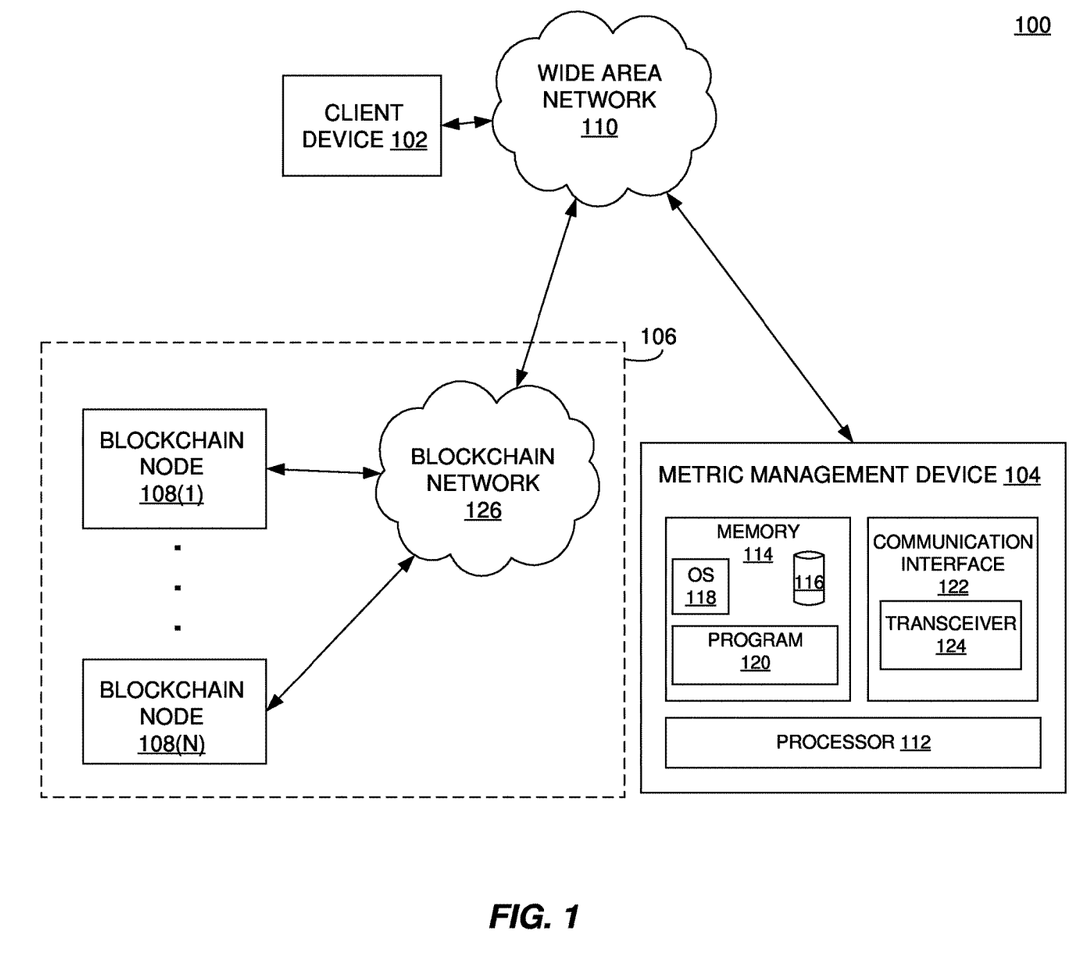
FIG. 1 is a block diagram of an example system environment that includes a client device, a metric management device, and a blockchain network with nodes, in accordance with one or more examples of the disclosed technology.

FIG. 1 is a block diagram of an example system environment 100 that includes a client device 102, a metric management device 104, and a blockchain network 106 with nodes 108(1)-108(n), in accordance with one or more examples of the disclosed technology. The client device 102, metric management device 104, and blockchain nodes 108(1)-108(n) are coupled together via one or more wide area networks (WANs) 110, for example.

The client device 102 can be a mobile computing device (e.g., a smart phone, tablet computer, smart wearable (e.g., a smart watch), portable laptop computer, voice command device, wearable augmented reality device, or other mobile computing device) or a stationary device (e.g., desktop computer), for example. The client device 102 hosts a web browser application in this particular example, which provides an interface to exchange information (e.g., requests to establish new metrics, metric change notifications, etc.) with the blockchain nodes 108(1)-108(n) and/or the metric management device 104, although other methods of communicating with the blockchain network 106 and/or metric management device 104 can also be used.

The metric management device 104 can interface with the client device 102 to provide metric metadata, send metric change notifications, and respond to other types of client queries, for example. The metric management device 104 can also interface with the blockchain nodes 108(1)-108(n) to receive metadata for new and existing metrics and to obtain information including stakeholders from change tokens, for example. The metric management device 104 can include a processor 112, memory 114, and data storage 116. The processor 112 can include one or more of a microprocessor, microcontroller, digital signal processor, co-processor or the like or combinations thereof capable of executing stored instructions and operating upon stored data.

The memory 114 of the metric management device 104 can include, in some implementations, one or more suitable types of memory (e.g., volatile or non-volatile memory, random access memory (RAM), read only memory (ROM), magnetic disks, optical disks, hard disks, flash memory, solid state drives, non-transitory computer-readable medium, and the like), for storing files and/or applications (e.g., a web browser application, a widget or gadget engine, and or other applications, as necessary), executable instructions and data.

The memory 114 can contain an operating system ("OS") 118 that can run program(s) 120. The program(s) 120 can perform one or more functions of the disclosed examples, such as explained in detail below with reference to FIG. 4. The metric management device 104 can also include a communication interface 122 for communicating with external systems or internal systems. The communication interface 122 can include a transceiver 124 to communicate with compatible devices, for example via short range, long range, or similar technologies that enables the metric management device 104 to communicate via the WAN 110 described herein.

The blockchain nodes 108(1)-108(n) of the blockchain network 106 are coupled together via a communication network 126, which can include local or wide area networks, for example. The communication network 126 can, therefore, facilitate transactions being made in the blockchain network 106 (e.g., storage of metric smart contracts by the client device 102) and communications between the blockchain nodes 108(1)-108(n) to maintain a distributed ledger associated with the transactions. The blockchain nodes 108(1)-108(n) can communicate with the metric management device 104 to report new metrics and respond to change and client queries, for example.

Figure 2:
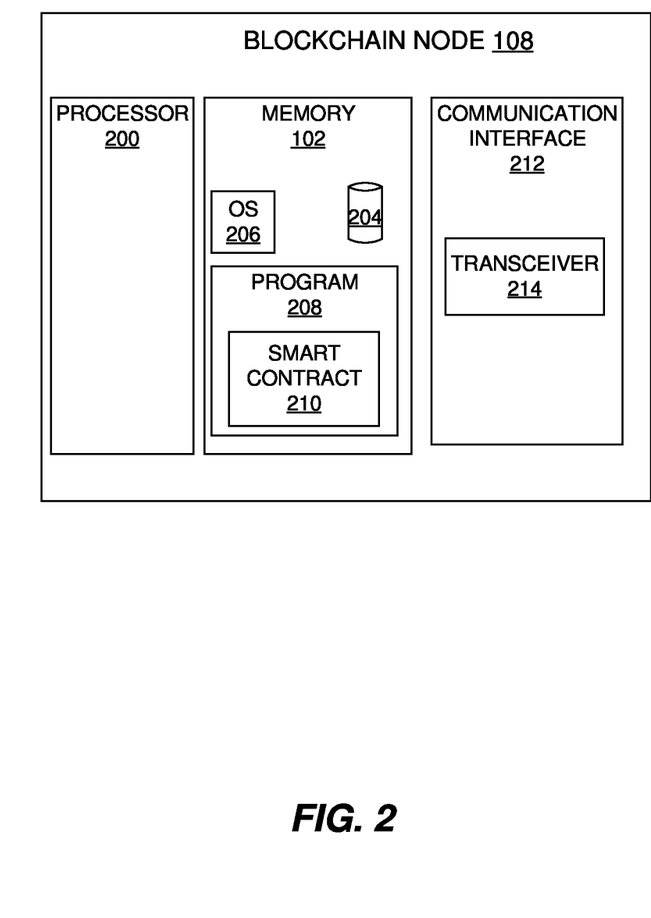
FIG. 2 is a component diagram of a blockchain node, in accordance with one or more examples of the disclosed technology.

FIG. 2 is a component diagram of one of the blockchain nodes 108(1)-108(n), in accordance with one or more examples of the disclosed technology. The blockchain node 108 can include a processor 200, memory 202, and data storage 204 (e.g., a distributed ledger database). The processor 200 can include one or more of a microprocessor, microcontroller, digital signal processor, co-processor or the like or combinations thereof capable of executing stored instructions and operating upon stored data.

The memory 202 of the blockchain node 108 can include, in some implementations, one or more suitable types of memory (e.g., volatile or non-volatile memory, RAM, ROM, magnetic disks, optical disks, hard disks, removable cartridges, flash memory, solid state drives, non-transitory computer-readable medium, and the like), for storing files and/or application, executable instructions, and data. The memory 202 can contain an OS 206 that can run program(s) 208. The program(s) 208 can perform one or more functions of the disclosed examples, as explained in detail below with reference to FIG. 3, for example. The memory 202 can also include any combination of one or more databases controlled by memory controller devices (e.g., server(s), etc.) or software, such as document management systems, Microsoft® SQL databases, SharePoint® databases, Oracle® databases, Sybase® databases, or other relational databases.

In this example, the blockchain node 108 also hosts a smart contract 210 with a specification (e.g., a set of executable instructions) configured to automatically mint new token metrics into the blockchain network 106 and report new metrics to the metric management device 104, for example. Other types and number of smart contracts can be stored in the memory 202 in other examples.

The blockchain node 108 can also include a communication interface 212 for communicating with external systems or internal systems. The communication interface 212 can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof. The communication interface 212 can include a transceiver 214 to communicate with compatible devices, for example via short range, long range, or similar technologies that enables the blockchain node 108 to communicate via the communication network 126 described herein.

Figure 3:
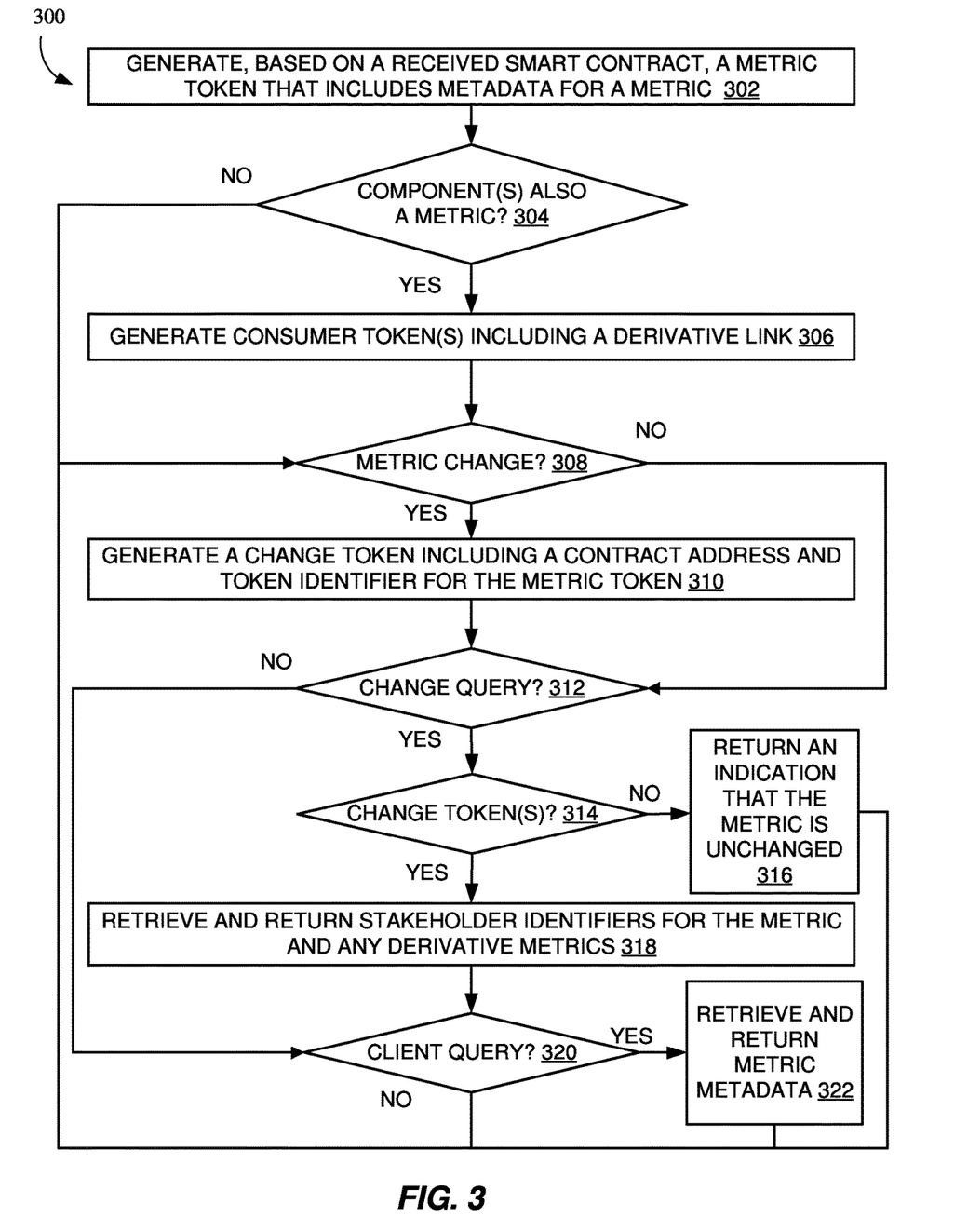
FIG. 3 is a flow diagram of an example method for maintaining metrics and derivative metrics in a blockchain network, including across metric changes, in accordance with one or more examples of the disclosed technology.

FIG. 3 is a flow diagram of an example method 300 for maintaining metrics and derivative metrics in the blockchain network 106, including across metric changes, in accordance with one or more examples of the disclosed technology. Method 300 may be performed by the blockchain node 108, which includes the processor 200 and memory 202 in communication with the processor 200 and storing instructions. When executed by the processor 200, the stored instructions cause the blockchain node 108 to perform certain functions, such as one or more steps described and illustrated herein with reference to method 300.

In block 302, the blockchain node 108 generates a metric token that includes metadata for a metric. The metric token can be generated based on the smart contract 210, which can be received from the client device 102 and stored in the blockchain network 106, for example. Accordingly, the smart contract 210 is configured to mint or generate the metric token, which can be a non-fungible token (NFT) or an Ethereum request for comment-20 (ERC-20) token minted and allocated on the Ethereum blockchain network, although other types of tokens can also be used.

The smart contract 210 received from the client device 102 can have a contract address in the blockchain network 106 and the metric token can have a token identifier and metric metadata, including one or more components of a metric and a set of stakeholder identifiers (e.g., identities and/or e-mail addresses or other correspondence information). The metric components correspond to the various aspects that collectively comprise or define the metric, and can themselves relate to other metrics. For example, a metric can be a consumer price index and one of the components can be the price of a weighted average market basket of consumer goods.

The price of a weighted average market basket of consumer goods in this example can be retrieved from another source within or outside of the blockchain network 106 and/or can be its own metric. Accordingly, one or more of the components can be defined based on a script and/or query configured to, when executed, retrieve data for the component from a database hosted external to the blockchain network 106. In these examples, the metric metadata includes information regarding generating the metric value along with the definition of the metric and associated components. In other examples, the metric metadata in the metric token can also include a creation timestamp, an indication of an entity (e.g., an identity) from which the smart contract 210 originated, and/or a formula for the metric that is based on the components, and other metric metadata can also be included in the metric token in other examples.

In addition to facilitating generation of the metric token, the smart contract 210 can be configured to, when executed, cause the blockchain node 108 to send an indication of the metric, notification rules, and/or a contract address for the smart contract 210 and/or a token identifier for the metric token to the metric management device 104. The notification rules can define notification parameters such as how often a change query is generated for the metric and/or how stakeholders are notified of a change to the metric, for example, although other notification rules can also be used. With the details reported via the smart contract 210, the metric management device 104 can maintain a metric inventory and manage change notifications, as explained in more detail below with reference to FIG. 5.

In block 304, the blockchain node 108 determines whether one of the components of the metric token generated based on the specification of the smart contract 210 is itself a metric. The determination in block 304 can be based on a definition of the component in the metric metadata received from the client device 102 with the smart contract 210. For example, the definition of the component can include another contract address and/or another token identifier for another metric token. If the blockchain node 108 determines that one of the components is also a matric, then the "Yes" branch is taken to block 306.

In block 306, the blockchain node 108 generates a consumer token including a derivative link and stores the generated consumer token in the blockchain network 106. The derivative link can include the contract addresses for the smart contracts associated with the metric and the derivative metric (e.g., the metric associated with the component) and/or the token identifiers for the metric tokens for the metric and the derivative metric. The derivative link and/or consumer token can also include other information in other examples.

With the consumer token, the blockchain node 108 can automatically determine and notify stakeholders for a metric of a change to a derivative metric, as described and illustrated in more detail below. Subsequent to generating the consumer token, or if the blockchain node 108 determines in block 304 that none of the components of the metric is itself a metric and the "No" branch is taken, then the blockchain node 108 proceeds to block 308.

In block 308, the blockchain node 108 determines whether the metric has changed. While the changed metric is the same as the metric associated with the metric token generated in step 300 in this example, the determination in block 308 can be made for any number of different metrics in other examples. The change to the metric can be determined based on a change transaction received from the client device 102 that is configured to use the smart contract 210 to facilitate a modification of at least one of the components of the metric, for example, although the metric can be modified in other ways in other examples. Accordingly, the determination in block 308 can be based on a change transaction received and/or recorded in the blockchain network 106, for example. If the blockchain node 108 determines that the metric has changed, then the "Yes" branch is taken to block 310.

In block 310, the blockchain node 108 generates a change token that includes a contract address for the smart contract 210 and a token identifier for the metric token generated in block 302. The change token stored in the blockchain network 106 records the change to the metric for tracking and/or reporting, for example, and can include an indication of an entity (e.g., an identity) from which the received change transaction originated, a timestamp at which the received change transaction was received, and/or the modified component(s), for example, although other change metadata can be recorded in the blockchain network 106 via the change token in other examples. Subsequent to generating the change token, or if the blockchain node 108 determines in block 308 that a metric has not changed and the "No" branch is taken, then the blockchain node 108 proceeds to block 312.

In block 312, the blockchain node 108 determines whether a change query is received, such as from the metric management computing device 104, for example. The metric management device 104 can be configured to periodically query the blockchain network 106 for metric changes, although the blockchain network 106 can also be configured to report metric changes to the metric management device 104 in other examples. If the blockchain node 108 determines in block 312 that a change query is received, then the "Yes" branch is taken block 314.

In block 314, the blockchain node 108 determines whether a change token has been recorded in the blockchain network 106 that is associated with the metric associated with the change query. The change token could have been generated or recorded as explained in block 310, for example. In some examples, the determination in block 314 can be based on a match of the contract address for the smart contract 210 and the token identifier for the metric token in the change query received from a metric management device 104 to a contract address and token identifier in a change token, for example, although other methods of determining whether a change token has been recorded to the metric can also be used.

In some examples, the determination in block 314 is further based on a current time and a timestamp in the identified change tokens such that the condition in block 314 is only satisfied for metric changes that have occurred subsequent to a prior iteration of blocks 312-314 for the metric. If the blockchain node 108 determines that "No" change tokens are identified in the blockchain network 106, then the "No" branch is taken to block 316.

In block 316, the blockchain node 108 returns an indication that the metric is unchanged in response to the change query. Accordingly, the blockchain node 108 can send to the metric management device 104 a message in response to the change query that includes a null set or another predetermined value understood by the metric management device 104 to be indicative of a lack of change to the metric subsequent to a prior iteration. However, if the blockchain node 108 determines in block 314 that there is at least one change token associated with the metric, then the "Yes" branch is taken to block 318.

In block 318, the blockchain node 108 retrieves and returns stakeholder identifiers for the changed metric associated with the change token and any derivative metrics for which the changed metric is a component. The stakeholder identifiers can be retrieved from the metric tokens for the changed and derivative metrics using the contract address and/or token identifier for the changed metric and a match of those values in derivative links of consumer tokens. The metric tokens and associated stakeholders can be identified based on the contract address and/or token identifier for those derivative tokens in the derivative links of the identified consumer tokens.

Accordingly, the blockchain node 108 effectively iterates through the consumer tokens associated with the changed token in order to identify metric tokens for the derivative tokens, and aggregates the stakeholder identifiers (e.g., unique usernames and/or e-mail address) associated with the changed and derivative tokens. By returning the sets of stakeholder identifiers to the metric management device 104 in response to the change query, the blockchain node 108 facilitates notification of entities associated with the sets of stakeholder identifiers of the modification to the changed metric, as described in more detail below. Subsequent to retrieving and returning the stakeholder identifiers in block 318, or if the blockchain node 108 determines that a change query has not been received in step 312 and the "No" branch is taken, then the blockchain node 108 proceeds to block 320.

In block 320, the blockchain node 108 determines whether a client query has been received, such as from the client device 102 via an interface provided by the metric management device 104, for example, although client queries can be received directly from the client device 102 and/or in other ways in other examples. The client queries in this example as associated with any query for metric metadata that originates with the client device 102, as compared to change queries relating whether a metric has changed that originate with the metric management device 104. For example, the change query can include an indication of the metric, a contract address for the smart contract 210, and/or a token identifier for the metric token, for example, along with a query regarding the component for the metric. If the blockchain node 108 determines that a client query has been received, then the "Yes" branch is taken to block 322.

In block 322, the blockchain node 108 retrieves and returns metric metadata by correlating parameters in the client query with the metric metadata maintained in the metric token generated and recorded in the blockchain network 106 in block 302, for example. Subsequent to retrieving and returning the metric metadata in block 322, returning the indication that the metric is unchanged in block 316, or if the blockchain node 108 determines in block 320 that a client query has not been received and the "No" branch is taken, then the blockchain node 108 proceeds back to block 302 in this example. One or more of blocks 302-322 can occur in a different order and/or in parallel in other examples. For example, blocks 312-318 can be performed in parallel with blocks 302-310 for any number of received change queries.

Figure 4:
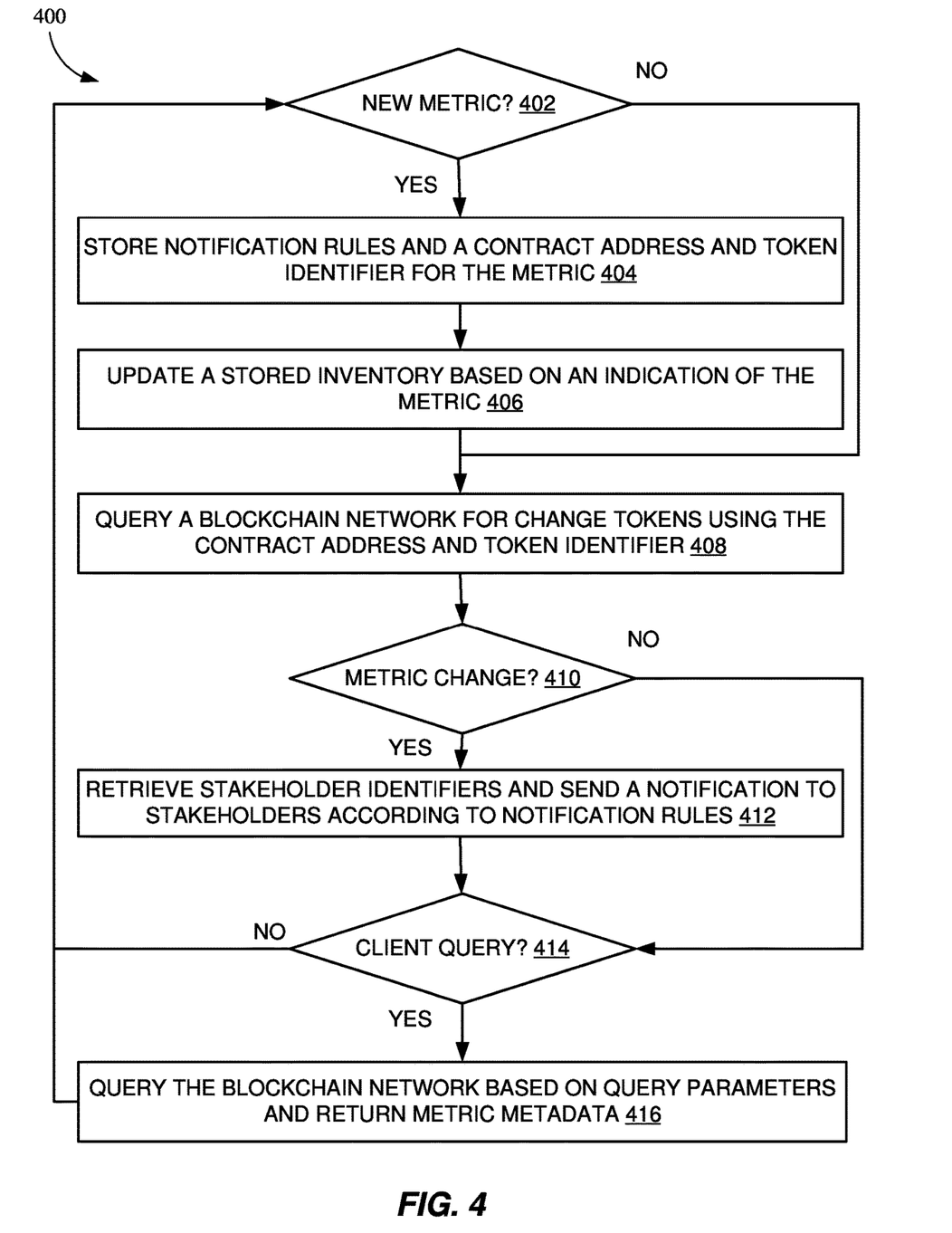
FIG. 4 is a flow diagram of an example method for facilitating metric definition, maintaining a metric inventory, and reporting metric changes, in accordance with one or more examples of the disclosed technology.

FIG. 4 is a flow diagram of an example method for facilitating definition of a metric (e.g., the metric for which a metric token was generated in block 302 or FIG. 3), maintaining a metric inventory, and reporting metric changes, in accordance with one or more examples of the disclosed technology. Method 400 may be performed by the metric management device 104, which includes the processor 112 and memory 114 in communication with the processor 112 and storing instructions. When executed by the processor 112, the stored instructions cause the metric management device 104 to perform certain functions, such as one or more steps described and illustrated herein with reference to method 400.

In block 402, the metric management device 104 determines whether a new metric has been established in the blockchain network 106. In some examples, the smart contract 210 is configured to send a notification to the metric management device 104 with metric metadata including an identifier (e.g., unique name) for the metric. As explained above with reference to block 302 of FIG. 3, the metric metadata can include a token identifier associated with the metric token for the metric, a contract address of the smart contract 210, notification rules, and/or stakeholders for the metric, for example, although other metric metadata can also be received for a new metric in block 402.

In other examples, the new metric and/or associated metadata can be defined by a user of the client device 104 via an interface provided by the metric management device 104. In these examples, the metric management device 104 can communicate with the blockchain node 108 to store the smart contract 210 on the blockchain network 106. If the metric management device 104 determines that a new metric has been established, then the "Yes" branch is taken to block 404.

In block 404, the metric management device 104 stores the metric metadata, including at least the contract address for the smart contract 210 and/or the token identifier (another address on the blockchain network 106) for the metric. Optionally, the notification rules and/or stakeholders can also be stored in block 404, although one or more portions of the metadata can also be retrieved by the metric management device 104 via query to the blockchain network 108 when required by that device.

In block 406, the metric management device 104 updates a stored inventory based on an indication of the metric included in the metric metadata received in block 402. In this example, the metric management device 104 is configured to generate and provide to the client device 102 an interface that facilitate user access to metric information. The interface can be a graphical user interface (GUI) that leverages the stored inventory of metrics to allow users to make selections and retrieve information (e.g., metric metadata) regarding the selected metrics that may be stored in the memory 114 (e.g., as described above with reference to block 404) and/or dynamically retrieved via query to the blockchain network 106. Subsequent to updating the stored inventory, or if the metric management device 104 determines in block 402 that a new metric has not been established in the current iteration and the "No" branch is taken, then the metric management device 104 proceeds to block 408.

In block 408, the metric management device 104 queries the blockchain network 106 for change tokens using the contract address for the smart contract 210, and/or token identifier of the metric token, stored in block 404. In some examples, the blockchain network 106 can be queried periodically or at regular intervals for particular metrics and, in other examples, notification rules received in block 402 can define the frequency for initiating the change query in block 408. Other methods for triggering a change query in block 408 can also be used in other examples.

In block 410, the metric management device 104 determines whether the metric associated with the query sent to the blockchain network 106 has changed. The change query sent in block 408 can be processed by the blockchain node 108 as described above with reference to blocks 312-318, for example. Accordingly, if the metric management device 104 receives an indication that the metric is unchanged from the blockchain node 108, then the condition in block 410 will not be satisfied and, otherwise, the condition in that block will be satisfied. If the metric management device 104 determines that the metric has changed, then the "Yes" branch is taken to block 412.

In block 412, the metric management device 104 retrieves stakeholder identifiers and sends a notification to stakeholders optionally according to notification rules received in block 402. The stakeholder identifiers can be received in block 402, stored in block 404, and retrieved from the memory 116 in block 412. In other examples, the stakeholder identifiers can be dynamically generated and returned by the blockchain network 106, as explained above with reference to block 318 of FIG. 3, and retrieved from the response from the blockchain network 106 to the change query. In these examples, the stakeholder identifiers can include stakeholders of the metric as well as stakeholders of derivative metrics that rely on the metric and/or for which the metric is a component.

The stakeholder identifiers can be identities, contact information, or any other unique indicators of entities that should receive a notification upon a change to the metric. Accordingly, in block 412 the metric management device 104 uses the stakeholder identifiers to send a notification regarding the change to the metric. Optionally, the notifications can include an indication of the metric metadata that has changed or any other contextual information, which can optionally be determine based on the notification rules for the metric. Subsequent to sending the notification(s), or if the metric management device 104 determines in block 410 that the metric has not changed and the "No" branch is taken, then the metric management device 104 proceeds to block 414.

In block 414, the metric management device 104 determines whether a query has been received from the client device 102. In this example, the metric management device 104 can provide a GUI to facilitate retrieval by users of the client device 102 of metric metadata. For example, a user may select a metric from the inventor stored in block 406 and presented via the GUI, and subsequent select parameter (s) (e.g., components, identity of metric author, last time the metric was changed) that relate to various portions of the metadata for the selected metric. Thereby, users including metric stakeholders have visibility to information regarding the metrics maintained on the blockchain network 106. If the metric management device 104 determines that a client query has been received, then the "Yes" branch is taken to block 416.

In block 416, the metric management device 104 queries the blockchain network 106 based on parameter(s) in the client query in order to obtain responsive information (e.g., a portion of the metric metadata). Optionally, the metric management device can correlate the indication of the metric (e.g., metric name) presented via the inventory and GUI with a stored smart contract address and/or metric token identifier, for example, in order to effectively query the blockchain network 106. The information received from the blockchain network 106 is then returned by the metric management device 104 to the client device 102 in response to the client query received in block 414.

Subsequent to returning the responsive information, or if the metric management device 104 determines in block 414 that a client query is not received in the current iteration and the "No" branch is taken, then the metric management device 104 proceeds back to block 402 in this example. One or more of blocks 402-416 can occur in a different order and/or in parallel in other examples. For example, blocks 402-406 can be performed in parallel with blocks 406-412 and/or 414-416 for any number of events change and/or client queries.

As described and illustrated by way of the examples herein, this technology advantageously provides a technical improvement to data storage structures and repositories for storing metrics. Specifically, this technology facilitates more effective tracking of metric changes, associations of derivative metrics, reporting metric metadata, and notifications regarding metric changes, including to stakeholders for derivative metrics. The blockchain network 106 of this technology maintains a distributed ledger with metric smart contracts and metric, consumer, and change tokens that provides increased visibility for users and allows for consistency across an enterprise with respect to downstream reporting and metric utilization, among other advantages.

Example Use Case

Figure 5:
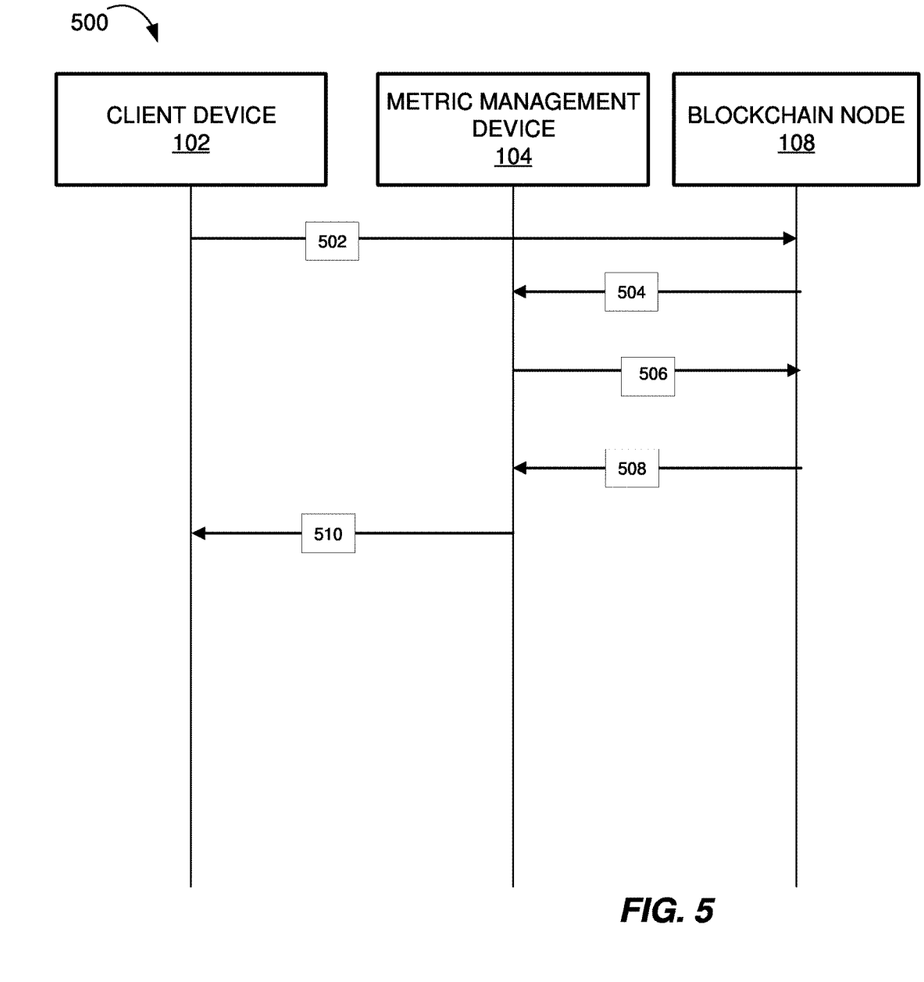
FIG. 5 is a timing diagram of an example method for generating a metric and receiving notifications regarding changes to the metric, including with respect to derivative metric components, in accordance with one or more examples of the disclosed technology.

The following example use case describes an example of a typical user flow pattern. This section is intended solely for explanatory purposes and not in limitation. FIG. 5 is a timing diagram of an example method for generating a metric and receiving notifications regarding changes to the metric, including with respect to derivative metric components, in accordance with one or more examples of the disclosed technology.

In block 502, the client device 102 send a smart contract 210 to the blockchain node 108 for recordation within the blockchain network 106. The smart contract 210 in this particular example is configured to cause the blockchain node 108 to mint a metric token for a macroeconomic risk metric. In this example, the client device 102 can be associated with a user that represents a financial institution having various business units that each price particular services using a measure of macroeconomic risk. The metadata in the smart contract 210 indicates that the macroeconomic risk metric has as one of its components an unemployment rate metric, which can be identified based on an identified for a metric token previously recorded in the blockchain network 106 and associated with that metric, for example.

Accordingly, in block 504, the blockchain node 108 executes the smart contract 210, generates a metric token, generates a consumer token with a derivative link, and reports the macroeconomic risk metric to the metric management device 104 by sending an address of the smart contract 210 on the blockchain network 106 and/or an identifier for the metric token. The generated metric token includes an indication of stakeholders (e.g., unique IDs within the financial institution network) for the macroeconomic risk metric along with the message from the client device 102 sent in block 502 (e.g., in the smart contract 210) and including an identifier for the creator of the macroeconomic risk metric.

In block 506, the metric management device 104 generates a change query for the unemployment rate metric, which it then sends to the blockchain node 108. The change query can be generated periodically and can include the address for a smart contract associated with the unemployment rate metric, for example, although another unique identifier of that metric can also be included in the change query. Outside of the particular flow illustrated in FIG. 5, another user of another client device changes the unemployment rate metric prior to the occurrence of block 508 by adding a component to that metric, which was recorded by the blockchain node 108 in the blockchain network 106 via a change token.

In block 508, the blockchain node 108 identifies the change token based on a match in that token of the address for the smart contract included in the change query, or an identifier for the unemployment rate metric token determined therefrom, for example. Since the notification rules previously stored for the unemployment rate metric indicate that an added component is a trigger for stakeholder notifications, the blockchain node 108 determines that the unemployment rate metric has changed such that notifications are required.

Thus, the blockchain node 108 aggregates stakeholder identifiers stored in the unemployment rate metric token, and any consumer tokens having a smart contract address or token identifier associated with the unemployment rate metric, including the consumer token recorded in the blockchain network 106 upon generation of the macroeconomic risk metric token in block 502. The aggregated stakeholder identifiers are then returned in block 508 to the metric management device 104 in response to the change query.

In block 510, the metric management device 104 identifies contact information (e.g., e-mail addresses) corresponding to the unique IDs that comprise the stakeholder identifiers, and generates and sends notifications regarding the change to the unemployment rate metric to the associated stakeholders. The notifications can include an indication of the unemployment rate metric and a description of the component added to that metric and resulting in the change, for example. In this example, one of the notifications is sent to the client device 102 because the macroeconomic risk metric originated by a user of that device is a derivative metric with respect to the unemployment rate metric, and the user of the client device 102 is therefore a relevant stakeholder.

Advantageously, the user of the client device 102 will be notified in this example of the change to the way values are calculated for the unemployment rate metric (e.g., based on the added component), which impacts the macroeconomic risk metric for which that user is a stakeholder. The user of the client device 102 can then optionally query the blockchain network 106 to determine more information regarding the change. Additionally, in the interim, users associated with the financial institution can create reports that rely on a measure of macroeconomic risk and are consistent as a result of utilization of the definition of that metric maintained in the blockchain network 106 as described and illustrated herein.

In some examples, disclosed systems or methods may involve one or more of the following clauses:

Clause 1: A blockchain node device, comprising: one or more processors; and memory in communication with the one or more processors and storing instructions that, when executed by the one or more processors, are configured to cause the blockchain node device to: store a smart contract having a first contract address in a blockchain network and configured to mint a first metric token having a first token identifier and comprising metric metadata comprising at least one or more components of a first metric and a first set of stakeholder identifiers; determine that a first one of the one or more components is a second metric based on a definition of the first one of the one or more components in the metric metadata, wherein the definition comprises a second contract address and a second token identifier for a second metric token associated with the second metric; generate a consumer token in the blockchain network that records a derivative link between the first metric and the second metric; store a change token in the blockchain network in response to a received change transaction that modifies a second one of the one or more components of the first metric, wherein the change token comprises at least the first contract address and the first token identifier; determine that the first metric has changed based on a match of the first contract address and the first token identifier in a query received from a metric management device to the first contract address and the first token identifier in the change token, wherein the metric management device is external to the blockchain network; retrieve the first and second sets of stakeholder identifiers from the first and second metric tokens, respectively, using the first contract address, the first token identifier, and the derivative link in the consumer token; and return the first and second sets of stakeholder identifiers to the metric management device in response to the query to facilitate notification of entities associated with the first and second sets of stakeholder identifiers of the modification to the first metric.

Clause 2: The blockchain node device of clause 1, wherein the derivative link comprises at least the first contract address, the first token identifier, the second contract address, and the second token identifier.

Clause 3: The blockchain node device of clause 1, wherein the first metric token comprises a non-fungible token (NFT) and the received change transaction is configured to use the smart contract to facilitate the modification of the second one of the one or more components.

Clause 4: The blockchain node device of clause 1, wherein the first metric token is unchanged following execution of the received change transaction and the change token further comprises an indication of an entity from which the received change transaction originated, a timestamp at which the received change transaction was received, and the modified second one of the one or more components.

Clause 5: The blockchain node device of clause 1, wherein the first metric token further comprises one or more of a creation timestamp, an indication of an entity from which the smart contract originated, or a formula for the first metric that is based on the one or more components.

Clause 6: The blockchain node device of clause 1, wherein the first metric token further comprises one or more of a script or a query configured to, when executed, retrieve data for a third one of the one or more components from a database hosted external to the blockchain network.

Clause 7: A blockchain node device, comprising: one or more processors; and memory in communication with the one or more processors and storing instructions that, when executed by the one or more processors, are configured to cause the blockchain node device to: generate a first metric token in a blockchain network according to a received smart contract, wherein the first metric token has a first token identifier and comprises metric metadata comprising components of a first metric and a first set of one or more stakeholder identifiers; store a change token in the blockchain network in response to a change transaction that modifies a first one of the components of the first metric, wherein the change token comprises a first contract address, the first token identifier, and an indication of the modified first one of the components; determine that the first metric has changed based on a match of the first contract address and the first token identifier in a received query to the first contract address and the first token identifier in the change token; retrieve the first set of one or more stakeholder identifiers from the first metric token using the first contract address and the first token identifier; and return the first set of one or more stakeholder identifiers in response to the received query to facilitate notification of entities associated with the first set of one or more stakeholder identifiers of the modification to the first metric.

Clause 8: The blockchain node device of clause 7, wherein the instructions, when executed by the one or more processors, are further configured to cause the blockchain node device to: determine whether a second one of the components is a second metric based on a definition of the second one of the components in the metric metadata, wherein the definition comprises a second contract address and a second token identifier for a second metric token associated with the second metric.

Clause 9: The blockchain node device of clause 8, wherein the instructions, when executed by the one or more processors, are further configured to cause the blockchain node device to generate a consumer token in the blockchain network that records a derivative link between the first metric and the second metric, when the second one of the components is a second metric.

Clause 10: The blockchain node device of clause 9, wherein the instructions, when executed by the one or more processors, are further configured to cause the blockchain node device to: retrieve a second set of one or more stakeholder identifiers from the second metric token based on the derivative link in the consumer token; and return the second set of stakeholder identifiers in response to the received query.

Clause 11: The blockchain node device of clause 10, wherein the derivative link comprises at least the first contract address, the first token identifier, the second contract address, and the second token identifier.

Clause 12: The blockchain node device of clause 7, wherein the first metric token comprises a non-fungible token (NFT) and the change transaction is configured to use the received smart contract to modify the first one of the components.

Clause 13: The blockchain node device of clause 7, wherein the first metric token is unchanged following execution of the change transaction and the change token further comprises an indication of an entity from which the change transaction originated, a timestamp at which the change transaction was received, and the modified first one of the components.

Clause 14: The blockchain node device of clause 7, wherein the first metric token further comprises one or more of a creation timestamp, an indication of an entity from which the received smart contract originated, or a formula for the first metric that is based on the one or more of the components.

Clause 15: The blockchain node device of clause 7, wherein the first metric token further comprises one or more of a script or a query configured to, when executed, retrieve data from a database for a third one of the components.

Clause 16: A blockchain node device, comprising: one or more processors; and memory in communication with the one or more processors and storing instructions that, when executed by the one or more processors, are configured to cause the blockchain node device to: store a smart contract having a contract address in a blockchain network and configured to mint a metric token having a token identifier and comprising metric metadata comprising one or more stakeholder identifiers and a definition of a metric; generate a change token in the blockchain network in response to a received change transaction that modifies a first component of the metric, wherein the change token comprises the contract address, the token identifier, and an indication of the modified first component; determine that the metric has changed based on a match in the change token of the contract address and the token identifier in a received query; and return the one or more stakeholder identifiers in response to the received query, wherein the one or more stakeholder identifiers are retrieved from the metric token using the contract address and the token identifier.

Clause 17: The blockchain node device of clause 16, wherein the metric token comprises a non-fungible token (NFT) and the received change transaction is configured to use the smart contract to facilitate the modification of the first component.

Clause 18: The blockchain node device of clause 16, wherein the metric token is unchanged following execution of the received change transaction and the change token further comprises one or more of an indication of an entity from which the received change transaction originated, a timestamp at which the received change transaction was received, or the modified first component.

Clause 19: The blockchain node device of clause 16, wherein the metric token further comprises one or more of a creation timestamp, an indication of an entity from which the smart contract originated, or a formula for the metric that is based on one or more components of the metric that are included in the metric metadata.

Clause 20: The blockchain node device of clause 16, wherein the metric token further comprises one or more of a script or a query configured to, when executed, retrieve data for a second component of the metric from a database is hosted external to the blockchain network.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A blockchain node device for facilitating a scalable metric repository for automated metric change notification and accurate downstream reporting, the blockchain node device comprising one or more processors and memory in communication with the one or more processors and storing instructions that, when executed by the one or more processors, are configured to cause the blockchain node device to:
store a smart contract received from a first client device via a wide area network and having a first contract address in a blockchain network;
mint based on the smart contract a first metric token having a first token identifier and comprising metric metadata comprising at least components of a first metric and a first set of stakeholder identifiers;
determine that a first one of the components is a second metric based on a definition of the first one of the components in the metric metadata, wherein the definition comprises a second contract address and a second token identifier for a second metric token associated with the second metric;
generate a consumer token in the blockchain network that records a derivative link between the first metric and the second metric;
receive a change transaction in the blockchain network, via the wide area network, and from a second client device, wherein the first metric token comprises a non-fungible token (NFT) and the change transaction is configured to use the smart contract to modify a second one of the components of the first metric maintained in the metric metadata of the first metric token;
store a change token in the blockchain network in response to the change transaction, wherein the change token comprises at least the first contract address and the first token identifier;
receive via the wide area network a query from a metric management device external to the blockchain network;
determine that the first metric has changed based on a match of the first contract address and the first token identifier in the query to the first contract address and the first token identifier in the change token;
retrieve the first and second sets of stakeholder identifiers from the first and second metric tokens, respectively, using the first contract address, the first token identifier, and the derivative link in the consumer token; and
return the first and second sets of stakeholder identifiers to the metric management device via the wide area network in response to the query to facilitate notification by the metric management device and via the wide area network of entities associated with the first and second sets of stakeholder identifiers of the change to the first metric, wherein one of the entities is associated with the first client device.

2. The blockchain node device of claim 1, wherein the derivative link comprises at least the first contract address, the first token identifier, the second contract address, and the second token identifier.

3. The blockchain node device of claim 1, wherein the first metric token is unchanged following execution of the received change transaction and the change token further comprises an indication of an entity from which the received change transaction originated, a timestamp at which the received change transaction was received, and the modified second one of the components.

4. The blockchain node device of claim 1, wherein the first metric token further comprises one or more of a creation timestamp, an indication of an entity from which the smart contract originated, or a formula for the first metric that is based on the components.

5. The blockchain node device of claim 1, wherein the first metric token further comprises one or more of a script or another query configured to, when executed, retrieve data for a third one of the components from a database hosted external to the blockchain network.

6. A blockchain node device, comprising one or more processors and memory in communication with the one or more processors and storing instructions that, when executed by the one or more processors, are configured to cause the blockchain node device to:
generate a first metric token in a blockchain network according to a smart contract received from a first client device via a wide area network, wherein the first metric token has a first token identifier and comprises metric metadata comprising components of a first metric and a first set of one or more stakeholder identifiers;
receive a change transaction in the blockchain network, via the wide area network, and from a second client device, wherein the first metric token comprises a non-fungible token (NFT) and the change transaction is configured to use the smart contract to modify a second one of the components of the first metric maintained in the metric metadata of the first metric token;
store a change token in the blockchain network in response to the change transaction, wherein the change token comprises a first contract address, the first token identifier, and an indication of the modified first one of the components;
receive via the wide area network a query from a metric management device;
determine that the first metric has changed based on a match of the first contract address and the first token identifier in the query to the first contract address and the first token identifier in the change token;
retrieve the first set of one or more stakeholder identifiers from the first metric token using the first contract address and the first token identifier; and
return the first set of one or more stakeholder identifiers to the metric management device via the wide area network in response to the query to facilitate notification by the metric management device via the wide area network of entities associated with the first set of one or more stakeholder identifiers of the change to the first metric, wherein one of the entities is associated with the first client device.

7. The blockchain node device of claim 6, wherein the instructions, when executed by the one or more processors, are further configured to cause the blockchain node device to:
determine whether a second one of the components is a second metric based on a definition of the second one of the components in the metric metadata, wherein the definition comprises a second contract address and a second token identifier for a second metric token associated with the second metric.

8. The blockchain node device of claim 7, wherein the instructions, when executed by the one or more processors, are further configured to cause the blockchain node device to generate a consumer token in the blockchain network that records a derivative link between the first metric and the second metric, when the second one of the components is a second metric.

9. The blockchain node device of claim 8, wherein the instructions, when executed by the one or more processors, are further configured to cause the blockchain node device to:
retrieve a second set of one or more stakeholder identifiers from the second metric token based on the derivative link in the consumer token; and
return the second set of stakeholder identifiers in response to the query.

10. The blockchain node device of claim 9, wherein the derivative link comprises at least the first contract address, the first token identifier, the second contract address, and the second token identifier.

11. The blockchain node device of claim 6, wherein the first metric token is unchanged following execution of the change transaction and the change token further comprises an indication of an entity from which the change transaction originated, a timestamp at which the change transaction was received, and the modified first one of the components.

12. The blockchain node device of claim 6, wherein the first metric token further comprises one or more of a creation timestamp, an indication of an entity from which the received smart contract originated, or a formula for the first metric that is based on the one or more of the components.

13. The blockchain node device of claim 6, wherein the first metric token further comprises one or more of a script or another query configured to, when executed, retrieve data from a database for a third one of the components.

14. A blockchain node device, comprising one or more processors and memory in communication with the one or more processors and storing instructions that, when executed by the one or more processors, are configured to cause the blockchain node device to:
store a smart contract received from a first client device via a wide area network and having a contract address in a blockchain network;
mint based on the smart contract a metric token having a token identifier and comprising metric metadata comprising one or more stakeholder identifiers and a definition of a metric;
receive a change transaction in the blockchain network, via the wide area network, and from a second client device, wherein the metric token comprises a non-fungible token (NFT) and the change transaction modifies a first component of the metric that is identified in the definition of the metric maintained in the metric token;
generate a change token in the blockchain network in response to the change transaction, wherein the change token comprises the contract address, the token identifier, and an indication of the modified first component;
receive via the wide area network a query from a metric management device;
determine that the metric has changed based on a match in the change token of the contract address and the token identifier in the query;
retrieve the stakeholder identifiers from the metric token using the contract address and the token identifier; and
return the stakeholder identifiers to the metric management device via the wide area network in response to the query to facilitate notification by the metric management device via the wide area network of entities associated with the stakeholder identifiers of the change to the metric, wherein one of the entities is associated with the first client device.

15. The blockchain node device of claim 14, wherein the metric token is unchanged following execution of the received change transaction and the change token further comprises one or more of an indication of an entity from which the received change transaction originated, a timestamp at which the received change transaction was received, or the modified first component.

16. The blockchain node device of claim 14, wherein the metric token further comprises one or more of a creation timestamp, an indication of an entity from which the smart contract originated, or a formula for the metric that is based on components of the metric that are included in the metric metadata.

17. The blockchain node device of claim 14, wherein the metric token further comprises one or more of a script or another query configured to, when executed, retrieve data for a second component of the metric from a database is hosted external to the blockchain network.

* * * * *